United States Patent
Aliakseyeu et al.

(10) Patent No.: US 12,048,079 B2
(45) Date of Patent: Jul. 23, 2024

(54) CONTROLLER FOR GENERATING LIGHT SETTINGS FOR A PLURALITY OF LIGHTING UNITS AND A METHOD THEREOF

(71) Applicant: SIGNIFY HOLDING B.V., Eindhoven (NL)

(72) Inventors: Dzmitry Viktorovich Aliakseyeu, Eindhoven (NL); Tobias Borra, Rijswijk (NL); Bartel Marinus Van De Sluis, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 69 days.

(21) Appl. No.: 17/791,953

(22) PCT Filed: Jan. 12, 2021

(86) PCT No.: PCT/EP2021/050419
§ 371 (c)(1),
(2) Date: Jul. 11, 2022

(87) PCT Pub. No.: WO2021/144232
PCT Pub. Date: Jul. 22, 2021

(65) Prior Publication Data
US 2023/0045111 A1 Feb. 9, 2023

(30) Foreign Application Priority Data

Jan. 14, 2020 (EP) .................................... 20151575

(51) Int. Cl.
*H05B 47/16* (2020.01)
*G06T 7/90* (2017.01)
*H05B 45/20* (2020.01)

(52) U.S. Cl.
CPC ............... *H05B 47/16* (2020.01); *G06T 7/90* (2017.01); *H05B 45/20* (2020.01)

(58) Field of Classification Search
None
See application file for complete search history.

(56) References Cited

U.S. PATENT DOCUMENTS

| 9,289,622 | B2 | 3/2016 | Feng et al. |
| 9,936,556 | B2 | 4/2018 | Chraibi et al. |
| 2008/0265797 | A1 | 10/2008 | Van Doorn |
| 2014/0104321 | A1 | 4/2014 | Steffy |
| 2017/0189640 | A1 | 7/2017 | Sadwick |
| 2018/0130445 | A1* | 5/2018 | Dazé .................... B60Q 3/80 |
| 2018/0279440 | A1 | 9/2018 | Van De Sluis et al. |
| 2018/0376564 | A1 | 12/2018 | Van De Sluis et al. |

FOREIGN PATENT DOCUMENTS

| WO | 2011124933 A1 | 10/2011 |
| WO | 2017174412 A1 | 10/2017 |
| WO | 2019076667 A1 | 4/2019 |

* cited by examiner

*Primary Examiner* — Jany Richardson

(57) ABSTRACT

A method of generating light settings for a plurality of lighting units, the method comprising obtaining one or more images, extracting a plurality of colors from the one or more images, selecting a subset of colors from the plurality of colors, wherein the subset of colors is selected based on a target time of day, and generating one or more light settings for the plurality of lighting units based on the selected subset of colors, wherein, when the one or more light settings are activated, the plurality of lighting units are controlled according to the subset of colors.

11 Claims, 4 Drawing Sheets

CONTROLLER FOR GENERATING LIGHT SETTINGS FOR A PLURALITY OF LIGHTING UNITS AND A METHOD THEREOF

CROSS-REFERENCE TO PRIOR APPLICATIONS

This application is the U.S. National Phase application under 35 U.S.C. § 371 of International Application No. PCT/EP2021/050419, filed on Jan. 12, 2021, which claims the benefit of European Patent Application No. 20151575.6, filed on Jan. 14, 2020. These applications are hereby incorporated by reference herein.

FIELD OF THE INVENTION

The invention relates to a method of generating light settings for a plurality of lighting units and to a computer program product for executing the method. The invention further relates to a controller for generating light settings for a plurality of lighting units.

BACKGROUND

Home and professional environments contain a large number of lighting units for creation of ambient, atmosphere, accent or task lighting. These controllable lighting units may be controlled via a user interface of a control device, for example a smartphone, via a (wireless) network. Some of these user interfaces enable a user to select an image, whereupon (dominant) colors are extracted from the image. A light scene may be created for one or more lighting units based on the extracted colors, such that the one or more lighting units can be controlled according to the extracted colors when the light scene is activated. The light scene may be saved in a memory, such that when the image or the light scene is recalled/activated later, the one or more lighting units may then be controlled according to the extracted colors.

SUMMARY OF THE INVENTION

The inventors have realized that the colors extracted from the image may not be suitable for every situation. If, for example, the extracted colors are warm colors (e.g. reds, oranges, yellows and warm-whites), these colors may be suitable for illumination in the evening, but less so for illumination in the morning. In another example, the extracted colors may be a mix of different colors (e.g. several warm colors and several cool colors). Such a mix may be neither suitable for illumination in the morning (e.g. due to the warm colors), nor in the evening (e.g. due to the cool colors). Hence, there is a need for improved color selection from images for creating a light scene. It is therefore an object of the present invention to provide improved color selection from images for creating a light scene.

According to a first aspect of the present invention, the object is achieved by a method of generating light settings for a plurality of lighting units, the method comprising:
  obtaining one or more images,
  extracting a plurality of colors from the one or more images,
  selecting a subset of colors from the plurality of colors, wherein the subset of colors is selected based on a target time of day, and
  generating one or more light settings for the plurality of lighting units based on the selected subset of colors, wherein, when the one or more light settings are activated at the target time of day, the plurality of lighting units are controlled according to the subset of colors.

The subset of colors is selected based on the target time of day. The target time of day may be the current time of day, or another time of day, for example a predefined time or time slot. Consequently, suitable colors may be selected for a specific time of day. One or more light settings (e.g. a light scene) are generated based on the colors of the subset, such that when the one or more light settings are activated (e.g. by a user, based on a lighting control routine, by a software application, etc.) the plurality of lighting units are controlled according to the subset of colors, thereby providing appropriate illumination for the situation. This advantageously provides improved color selection from images for creating a light scene.

The subset may be selected from the plurality of colors such that a color spectrum of the subset of colors positively influences the circadian rhythm of a user at the target time of day. It may be beneficial to stimulate the circadian rhythm of the user. Alternatively, the subset may be selected from the plurality of colors such that a color spectrum of the subset of colors negatively influences the circadian rhythm of a user at the target time of day. In some situations, it may be desirable to adjust the circadian rhythm of a user, for example to reduce a jetlag, or to keep the user awake longer (e.g. by providing blue light in the evening).

The subset of colors may be selected from the plurality of colors upon selection of the one or more images. Alternatively, the subset of colors may be selected from the plurality of colors for each of one or more images during a configuration phase, such that when, for example, the image is selected at a target time of day, the corresponding subset/light scene is selected, and the lighting units are controlled accordingly.

The step of selecting the subset of colors may comprise: selecting a plurality of different subsets of colors from the plurality of colors, and associating each subset with a respective target time of day. The step of generating the one or more light settings may comprise: generating a plurality of light scenes based on the plurality of different subsets, wherein each light scene is associated with the respective target time of day, wherein, when a light scene of the plurality of light scenes is activated, the plurality of lighting units are controlled according to a subset of colors associated with the respective target time of day. In other words, multiple subsets of colors may be selected from the plurality of colors for different times of day. Alternatively, a single subset of colors may be selected from the plurality of colors for a target time of day. The benefit of the latter is that the selection (and the extraction) may be executed only when needed (e.g. at a specific time of day when the image is selected). The benefit of the former is that for certain times of day a subset/light scene is already available for controlling the lighting units when the light scene is activated.

The one or more colors of the subset of colors may be similar to one or more colors of another subset of colors also selected from the plurality of colors of the image based on another target time of day. The one or more colors of the subset of colors may be similar to one or more colors of an earlier selected subset of colors. If multiple subsets of colors are selected from the plurality of colors for different times of day, one or more colors of a first subset of colors may be similar to one or more colors of a second subset of colors.

The light scenes generated based on the different subsets will therefore have similarities. Having overlapping or similar colors in different light scenes is beneficial because it ensures recognizability of the image.

The one or more light settings may be activated when the image is selected by a user. The user may, for example, select the image via a user interface of a lighting control device (e.g. by selecting the image on a touch-sensitive display, by requesting a light scene via a voice assistant which selects the image based on the voice query of the user, by providing a touch input on a button of a light switch wherein the button is associated with the image, etc.). Additionally or alternatively, the one or more light settings may be activated when the more images are rendered on a display. The one or more images may, for example, be sequential images of a video being displayed on the display. By controlling the plurality of lighting units according to images subsets of colors of the video, which subsets of colors are selected based on the target time of day, the video-watching experience may be improved. Additionally, the circadian rhythm of the user may be affected (either positively or negatively).

The extracted plurality of colors may be dominant colors in the one or more images. This is beneficial, because it ensures recognizability of the image. If no appropriate subset of colors can be selected from the plurality of dominant colors for a specific time of day, the method may further comprise: selecting less dominant colors from the image. The less dominant colors may be added to the plurality of colors. This enables selection of appropriate colors for the subset, and generation of an appropriate light scene for the target time of day.

The method may further comprise: determining a number of colors of the plurality of colors to be extracted from the one or more images based on a number of subsets that are to be selected. If more subsets are to be selected (and more light scenes are to be generated), the number of the plurality of colors may be higher.

The method may further comprise: determining a number of colors of the plurality of colors to be extracted from the one or more images based on a number of lighting units. If the number of lighting units is higher, the number of the plurality of colors may be higher.

The method may further comprise: determining a difference between a color spectrum of the subset of colors and a target color spectrum, and if the difference exceeds a threshold, adjusting the colors of the subset of colors to change the difference. The difference may be increased or decreased, depending on the requirements of the situation. It may, for example, be beneficial that if the target color spectrum is to be rendered by the lighting units the colors are adjusted such that the difference between the color spectrum and the target color spectrum is reduced.

The method may further comprise: determining a difference between a color spectrum of the subset of colors and a target color spectrum, and if the difference exceeds a threshold, rendering, via a user interface, a notification indicative thereof. The notification may, for example, indicate to the user that the image might not be suitable for the target time of day.

When the one or more light settings are activated, the plurality of lighting units may be controlled according to the subset of colors over time. The one or more light settings may form a dynamic light scene.

According to a second aspect of the present invention, the object is achieved by computer program product for a computing device, the computer program product comprising computer program code to perform any of the above-mentioned methods when the computer program product is run on a processing unit of the computing device.

According to a third aspect of the present invention, the object is achieved by a controller for generating light settings for a plurality of lighting units, the controller comprising:

a processor configured to obtain one or more images, extract a plurality of colors from the one or more images, select a subset of colors from the plurality of colors, wherein the subset of colors is selected based on a target time of day, and generate one or more light settings for the plurality of lighting units based on the selected subset of colors, wherein, when the one or more light settings are activated at the target time of day, the plurality of lighting units are controlled according to the subset of colors.

It should be understood that the computer program product and the controller may have similar and/or identical embodiments and advantages as the above-mentioned methods.

The term "light scene" in the context of the present invention should be understood as a one or more lighting control settings for one or more lighting units. The lighting control settings may relate light properties such as the color, intensity, saturation, beam size, beam shape, etc. according to which the one or more lighting units are controlled. The light scene may be a dynamic light scene, wherein one or more light properties change over time.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
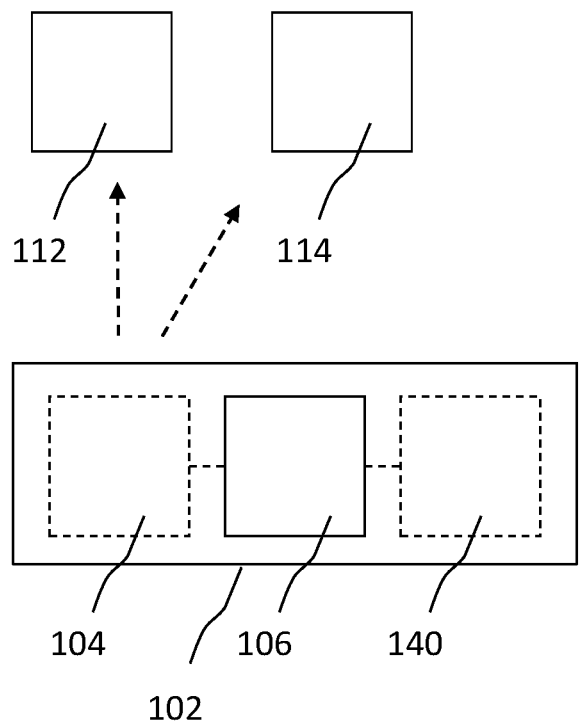
FIG. 1 shows schematically an embodiment of a system comprising a controller for generating light settings for a plurality of lighting units.

FIG. 1 shows schematically a system 100 comprising a controller 102 for generating light settings for a plurality of lighting units 112, 114. The controller 102 comprises a processor 106 configured to obtain one or more images 200, extract a plurality of colors from the one or more images, select a subset of colors from the plurality of colors, wherein the subset of colors is selected based on/for a target time of day. The processor 106 is further configured to generate one or more light settings (also referred to as "light scene") for the plurality of lighting units 112, 114 based on the selected subset of colors, wherein, when the one or more light settings are activated at the target time of day, the plurality of lighting units 112, 114 are controlled according to the subset of colors.

The lighting units 112, 114 comprise one or more (LED) light sources. The lighting units 112, 114 may be light bulbs, light strips, TLEDs, light tiles, etc. The lighting units 112, 114 may comprise a control unit, such as a microcontroller (not shown), for controlling the light output generated by the one or more light sources (e.g. an LED light source) based on received lighting control commands (which may be based on the generated light settings/light scene, which may be received from the controller 102). A lighting control command may comprise lighting control instructions for controlling the light output, such as the color, intensity, saturation, beam size, beam shape, etc. of the one or more light sources.

The controller 102 may be comprised in any type of lighting control device. The controller 102 may, for example, be comprised in a mobile device (e.g. a smartphone, a wearable device, a (tablet) pc, etc.), in a central lighting controller (e.g. a bridge, a router, a central home controller, a smart voice assistant, etc.), a remote server connected to the lighting units 112, 114 via a network/the internet, etc. The controller 102 may be configured to control the lighting units 112, 114.

The controller 102 may comprise a communication unit 104. The communication unit 104 may be configured to communicate lighting control commands via any wired or wireless communication protocol (e.g. Ethernet, DALI, Bluetooth, Wi-Fi, Li-Fi, Thread, ZigBee, etc.) with the lighting units 112, 114, either directly or indirectly.

The communication unit 104 may be further configured to obtain the one or more images form a remote source (e.g. via the internet). Additionally or alternatively, the processor 106 may obtain the one or more images from a memory (not shown) of the controller 102 and/or form a camera (not shown) of the controller 102.

The one or more images may, for example, be an image selected by a user to control the lighting units based on colors of that image. Alternatively, the one or more images may be a sequence of images of a video. The processor 106 may obtain the video from a (remote) memory. The video may, for example, be streamed via a network or stored on a local storage medium, and be rendered on a display (e.g. a tv, a portable device such as a smartphone, etc.). The processor 106 may be configured to analyze the one or more images of the video, extract the colors from the images and select one or more subsets based on the target/current time of day to generate the one or more light settings for the plurality of lighting 112, 114. The processor 106 may be further configured to control the lighting units 112, 114 based on the subsets substantially synchronized with the video such that the colors of the light emitted by the lighting units 112, 114 correspond to the colors of the video.

Figure 2:
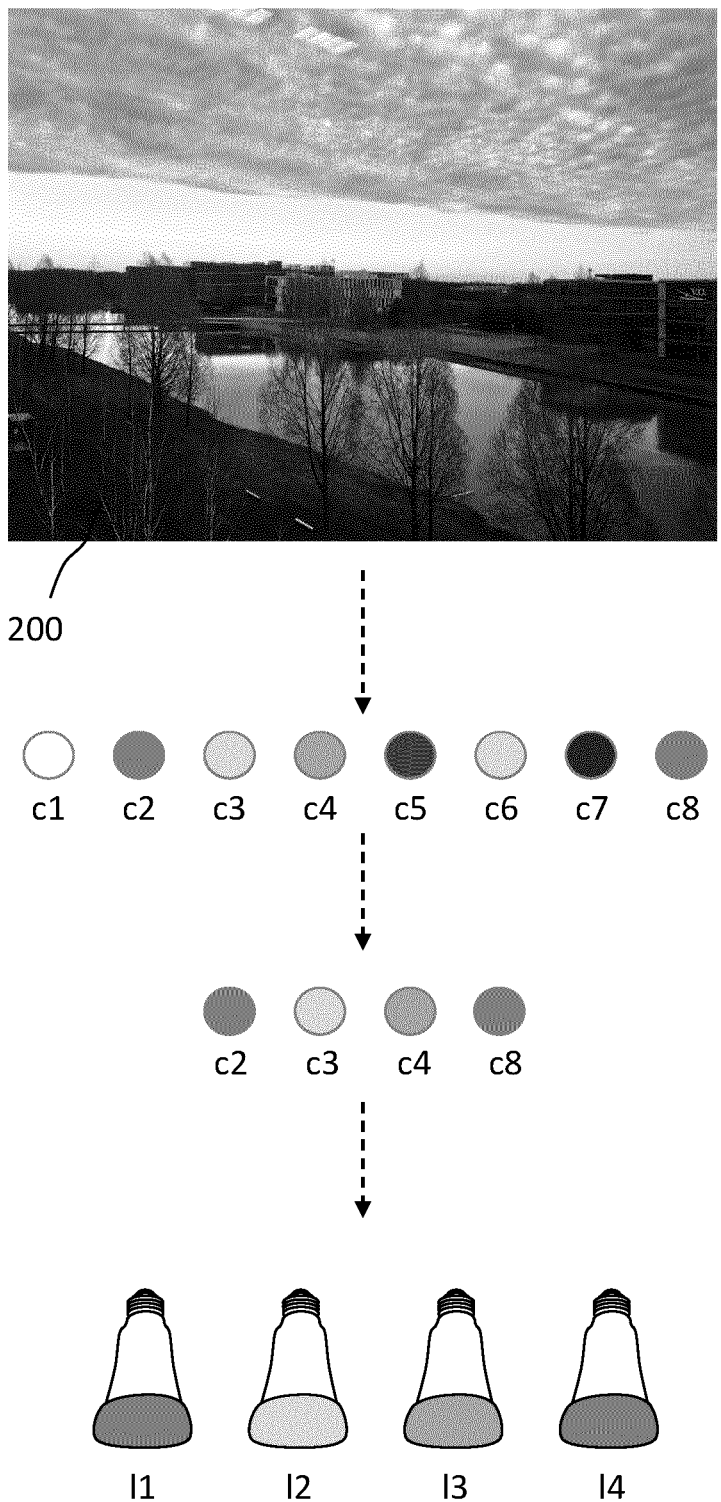
FIG. 2 shows schematically steps of extracting and selecting a subset of colors from an image.

The processor 106 is configured to extract the plurality of colors from the one or more images. FIG. 2 illustrates an example wherein colors c1-c8 are extracted from image 200. The colors may be extracted from the image by analyzing color values of pixels or groups of pixels of the image 200. The extracted colors may, for example, be dominant colors from the image 200. Techniques for extracting colors from images are known in the art and will therefore not be discussed in detail.

The processor 106 is further configured to select a subset of colors from the plurality of colors, wherein the subset of colors is selected based on a target time of day. FIG. 2 illustrates an example wherein colors c2, c3, c4 and c8 are selected from the plurality of colors c1-c8. The target time of day may, for example, be a current time of day. Alternatively, the target time of day may be a predetermined time of day (e.g. 08:00 AM, 06: PM, etc.), or a time period (e.g. 08:00 AM-10:00 AM or 08:00 PM-11:00 PM). The processor 106 may be configured to select the subset of colors such that an appropriate subset for the target time of day is selected. The processor 106 may, for example, access a memory storing associations between color values (e.g. a target color spectrum, RGB values, CIE values, etc.) and times of day. The processor 106 may compare the plurality of colors of the image with the associations stored in the memory and select the subset of colors such that the colors of the subset match colors associated with the target time of day. Associations between the color values and the times of day may, for example, be predefined, be user defined (e.g. based on user preferences), be obtained based on historical user preferences/selections, be based on circadian color profiles, etc. The processor 106 may be further configured to select the subset of colors based on a target day or period of days. The processor 106 may, for example, select different colors for a summer period compared to a winter period, or select different colors for Halloween compared to Christmas.

The processor 106 is further configured to generate one or more light settings for the plurality of lighting units 112, 116 based on the selected subset of colors, wherein, when the one or more light settings are activated, the plurality of lighting units 112, 114 are controlled according to the subset of colors. FIG. 2 illustrates an example wherein a light scene is created for colors c2, c3, c4 and c8, and wherein lighting units l1-l4 are controlled according to the light scene.

The light scene may be activated in different ways. The light scene may, for example, be selected by a user. The user may select the image or the light scene that has been generated based on the image via a user interface (e.g. via a touch-sensitive display, by providing a voice command, by providing a gesture, by actuating a switch, by actuating a sensor, etc.), whereupon the light scene is activated and the lighting units 112, 114 are controlled accordingly. In another example, the light scene may be activated based on a lighting control routine. A user or a software application may have set a timer for activating the light scene (e.g. at the target time of day). In another example, the light scene may be activated by a software application, which may be running on a device (e.g. on the controller 102, on a central home controller, on a voice assistant, on a cloud-based application, etc.). In another example, the one or more light settings may be activated when the one or more images is rendered on a display.

The controller 102 may comprise a user interface 140 (e.g. a touch-sensitive display, a microphone, a camera or gesture sensor for detecting a gesture, a switch), etc. The user interface 140 may be configured to receive a user input to activate the one or more light settings. Additionally or alternatively, the user interface 140 may be configured to receive a user input indicative of a selection of the one or more images (or a video comprising the one or more images). Additionally or alternatively, the user interface 140 may be configured to receive a further user input, which may be indicative of an approval of the generated one or more light settings and/or indicative of an adjustment of the one or more light settings.

The processor 106 may be further configured to select the subset from the plurality of colors such that a color spectrum of the subset of colors positively influences the circadian rhythm of a user at the target time of day. The target time of day may, for example, be the evening (e.g. between 20:00 PM and 23:00 PM) and the processor 106 may select warm colors from the plurality of colors extracted from the one or more images.

The processor 106 may be further configured to select the subset from the plurality of colors such that a color spectrum of the subset of colors negatively influences the circadian rhythm of a user at the target time of day. In some situations, it may be desirable to adjust the circadian rhythm of a user, for example to reduce a jetlag, or to keep the user awake longer (e.g. by providing cool light in the evening).

The processor 106 may be configured to select the subset from the plurality of colors based on melatonin suppression levels of the plurality of colors. Melatonin is a hormone that regulates the sleep-wake cycle/the circadian rhythm of a person. The effects of different colors of light on the melatonin production of a person are known in the art and will therefore not be discussed in detail.

The processor 106 may be configured to select the subset of colors from the plurality of colors upon selection of the one or more images. The one or more images may, for example, be selected by a user, by a software application, etc. Alternatively, the processor 106 may select the subset of colors from the plurality of colors for each of one or more images during a configuration phase.

Figure 3:
FIG. 3 shows schematically steps of extracting and selecting a plurality of subsets of colors from an image.
Figure 3:
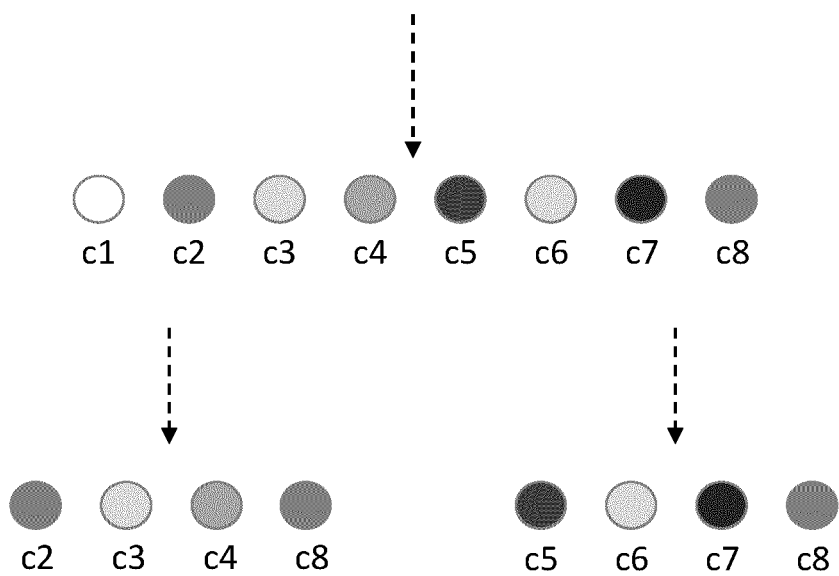

The processor 106 may be configured to select a plurality of different subsets of colors from the plurality of colors, and associate each subset with a respective target time of day, and generate a plurality of respective light scenes for the respective subsets. FIG. 3 illustrates an example wherein a first light scene is created for a first subset of colors c2, c3, c4 and c8 for a first target time of day (e.g. in the morning), and wherein a second light scene is created for a second subset of colors c5, c6, c7 and c8 for a second target time of day (e.g. in the evening).

The processor 106 may be further configured to select colors of the (first) subset of colors such that one or more colors of the (first) subset are similar to one or more colors of another (second) subset of colors selected from the plurality of colors of the image. FIG. 3 illustrates an example wherein color c8 occurs in a first subset of colors (c2, c3, c4, c8) for a first target time of day (e.g. in the morning) and in a second subset of colors (c5, c6, c7, c8) for a second target time of day (e.g. in the evening).

The processor 106 may be further configured to determine a number of colors of the plurality of colors to be extracted from the image based on a number of subsets that are to be selected. If more subsets are to be selected (and more light scenes are to be generated), the number of the plurality of colors may be higher. Additionally or alternatively, the processor 106 may be configured to determine a number of colors of the plurality of colors to be extracted from the image based on a number of lighting units 112, 114. If the number of lighting units is higher, the number of the plurality of colors may be higher.

The processor 106 may analyze the image and determine which colors to extract from image based on a target color spectrum. If the target color spectrum requires, for example, desaturated colors (e.g. for functional/task lighting at a target moment in time (e.g. from 09:00 AM-05:00 PM)), the processor 106 may extract desaturated colors from the image.

The processor 106 may be further configured to select the subset of colors based on one or more properties of the lighting units 112, 114. The processor 106 may be configured to receive information indicative of the properties (e.g. via the communication unit 104 from a central lighting control system, or by accessing an internal/external memory). A property may, for example, relate to the type of a lighting unit (e.g. an LED strip, a spotlight, a bulb, etc.) and/or the number of controllable light sources. A property may, for example, relate to the light rendering capabilities of a lighting unit (e.g. beam shape/size, available color spectrum, etc.). If, for example, one or more lighting units of the plurality of lighting units 112, 114 are unable to provide colored light but different types of white light, the selection of the subset may be such that less saturated colors are selected.

The processor 106 may be configured to select additional colors from the one or more images if no appropriate subset of colors can be selected from the plurality of colors for a specific time of day, or if the difference between the target color spectrum and the color spectrum of the plurality of colors exceeds the threshold. If, for example, the plurality of colors comprises only cool colors (e.g. different shades of blue and white), and a light scene for the evening is to be generated (which requires warm colors), the processor 106 may for example select less dominant colors form the image that are appropriate for the target time of day (e.g. warmer colors). If, for example, the target color spectrum requires desaturated colors (e.g. for a certain time of day when functional/task illumination is required) and the plurality of colors comprises saturated colors, the processor 106 may select additional desaturated colors from the one or more images.

The processor 106 may be further configured to determine a difference between a color spectrum of the subset of colors and a target color spectrum. The processor 106 may, if the difference exceeds a threshold, adjust the colors of the subset of colors to change the difference. The difference may be increased or decreased, depending on the requirements of the situation. If, for example, the target color spectrum requires desaturated colors (e.g. for a certain time of day when functional/task illumination is required) and the plurality of colors comprise saturated colors, the processor 106 may adjust the saturated colors by desaturating the colors. If, for example, the target color spectrum requires cool colors (e.g. for a certain time of day when functional/task illumination is required) and the plurality of colors comprise warm colors, the processor 106 may adjust the warm colors by changing the color temperature of the colors.

The processor 106 may be further configured to determine a difference between a color spectrum of the subset of colors and a target color spectrum, and if the difference exceeds a threshold, to render, via a user interface, a notification indicative thereof. The user interface 140 may be comprised in the controller 102. The notification may, for example, be rendered on a (touch-sensitive) display, an audio rendering device, etc. to indicate to the user that an image might not be suitable for the target time of day.

Figure 4:
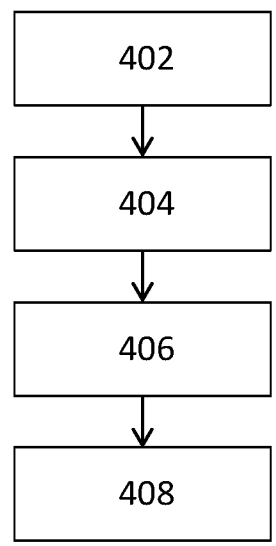
FIG. 4 shows schematically a method of generating light settings for a plurality of lighting units.

FIG. 4 shows schematically a method 400 of generating light settings for a plurality of lighting units. The method comprises the steps of obtaining 402 one or more images, extracting 404 a plurality of colors from the one or more images, selecting 406 a subset of colors from the plurality of colors, wherein the subset of colors is selected based on a target time of day, and generating 408 one or more light settings for the plurality of lighting units based on the selected subset of colors, wherein, when the one or more light settings are activated, the plurality of lighting units are controlled according to the subset of colors.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of generating light settings for a plurality of lighting units, the method comprising:
    obtaining one or more images,
    extracting a plurality of colors from the one or more images,
    selecting a plurality of different subsets of colors from the plurality of colors,
    associating each subset with a respective target time of day, and
    generating a plurality of light scenes based on the plurality of different subsets, wherein each light scene is associated with the respective target time of day, wherein, when a light scene of the plurality of light scenes is activated, the plurality of lighting units are controlled according to the subset of colors associated with the respective target time of day.

2. The method of claim 1, wherein at least one of the plurality of different subsets of colors is selected from the plurality of colors such that a color spectrum of the at least one of the plurality of different subsets of colors changes the circadian rhythm of a user at the target time of day.

3. The method of claim 1, wherein at least one of the respective target times of day is the current time of day.

4. The method of claim 1, wherein at least one of the plurality of different subsets of colors is selected from the plurality of colors upon selection of the one or more images.

5. The method of claim 1, wherein one or more colors of at least one of the plurality of different subsets of colors are the same as one or more colors of another subset of colors also selected from the plurality of colors of the image based on another target time of day.

6. The method of claim 1, wherein the one or more of light settings are activated when the one or more images are selected by a user and/or when the one or more images are rendered on a display.

7. The method of claim 1, wherein the extracted plurality of colors are dominant colors in the one or more images.

8. The method of claim 1, wherein the method further comprises:
    determining a number of colors of the plurality of colors to be extracted from the one or more images based on a number of subsets that are to be selected.

9. A method of generating light settings for a plurality of lighting units, the method comprising:
    obtaining one or more images,
    extracting a plurality of colors from the one or more images,
    selecting a subset of colors from the plurality of colors, wherein the subset of colors is selected based on a target time of day,
    generating one or more light settings for the plurality of lighting units based on the selected subset of colors, wherein, when the one or more light settings are activated at the target time of day, the plurality of lighting units are controlled according to the subset of colors,
    determining a difference between a color spectrum of the subset of colors and a target color spectrum, and
    if the difference exceeds a threshold, rendering, via a user interface, a notification indicative thereof.

10. The method of claim 9, wherein the method further comprises:
    if the difference exceeds a threshold, adjusting the colors of the subset of colors to adjust the difference.

11. A controller for generating light settings for a plurality of lighting units, the controller comprising:
    a processor configured to obtain one or more images, extract a plurality of colors from the one or more images, select a subset of colors from the plurality of colors, wherein a plurality of different subsets of colors is selected and each subset is associated with a respective target time of day, and generate a plurality of light scenes based on the plurality of different subsets, wherein each light scene is associated with the respective target time of day, wherein, when a light scene of the plurality of light scenes is activated, the plurality of lighting units are controlled according to the subset of colors associated with the respective target time of day.

* * * * *